Nov. 3, 1964     J. L. PETERS     3,155,826
MASS SPECTROMETER LEAK DETECTOR INCLUDING
A NOVEL REPELLER-HEATER ASSEMBLY
Filed Dec. 29, 1961     2 Sheets-Sheet 2
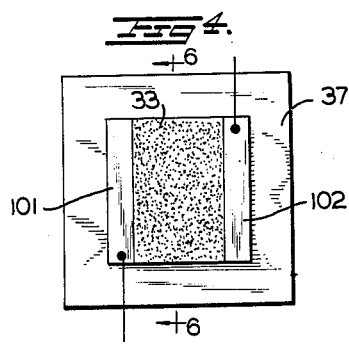
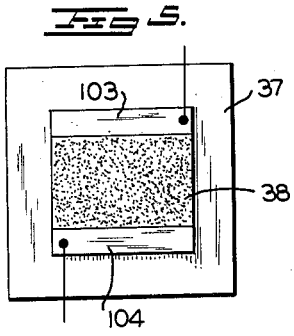
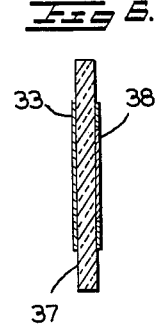
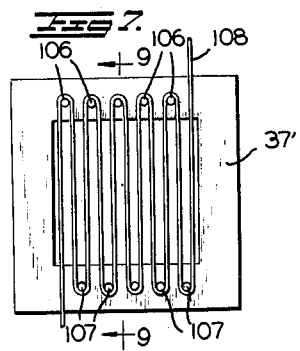
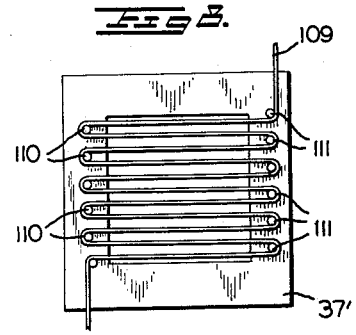
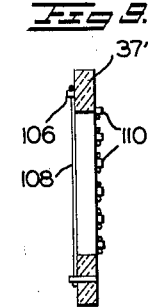
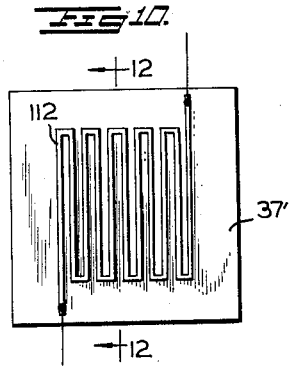
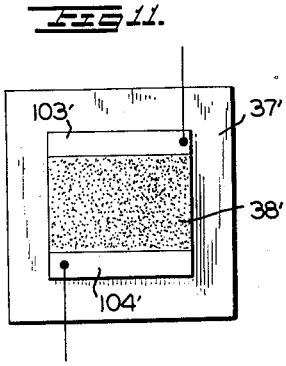
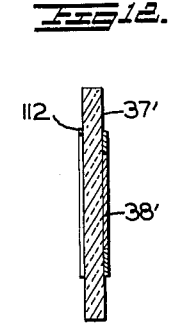
INVENTOR.
JOHN L. PETERS
BY
*George L. Black*
AGENT 3,155,826
MASS SPECTROMETER LEAK DETECTOR INCLUDING A NOVEL REPELLER-HEATER ASSEMBLY
John L. Peters, 114 Dikeman St., Hempstead, N.Y.
Filed Dec. 29, 1961, Ser. No. 163,111
14 Claims. (Cl. 250—41.9)

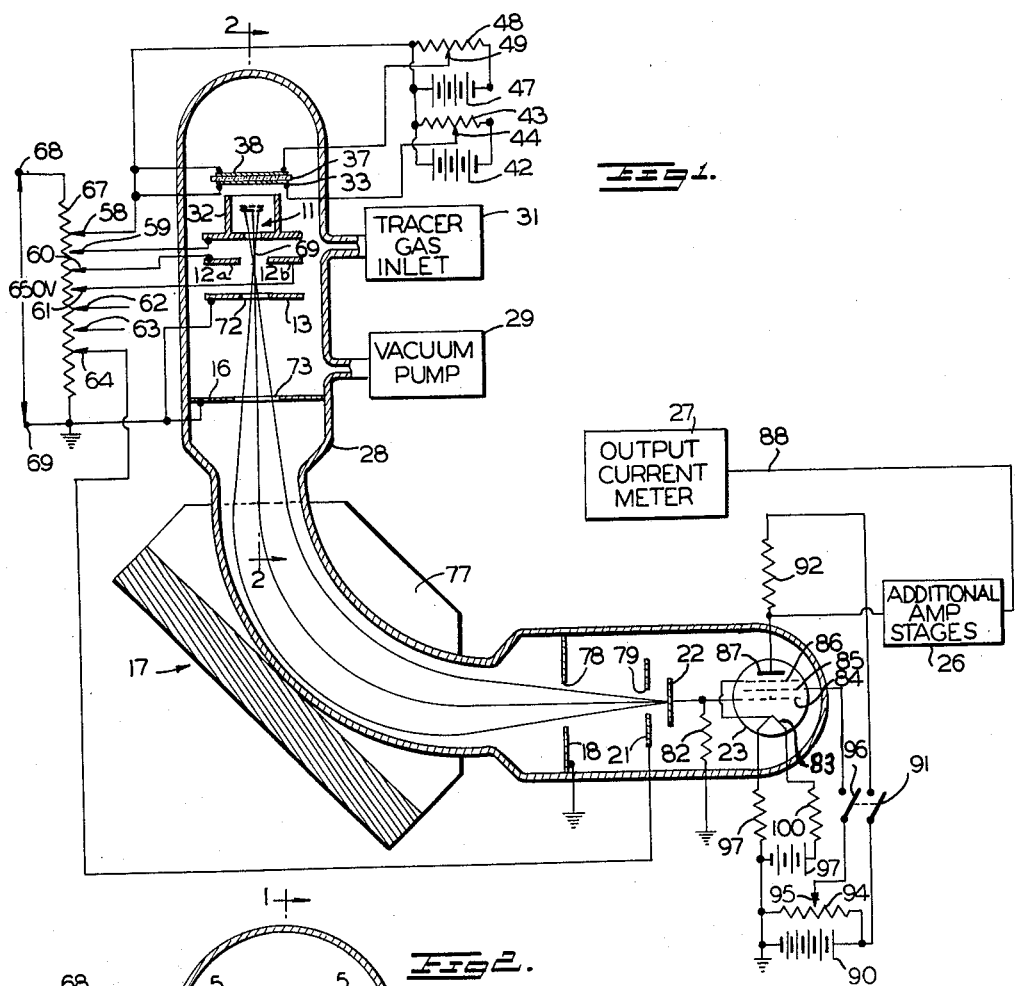
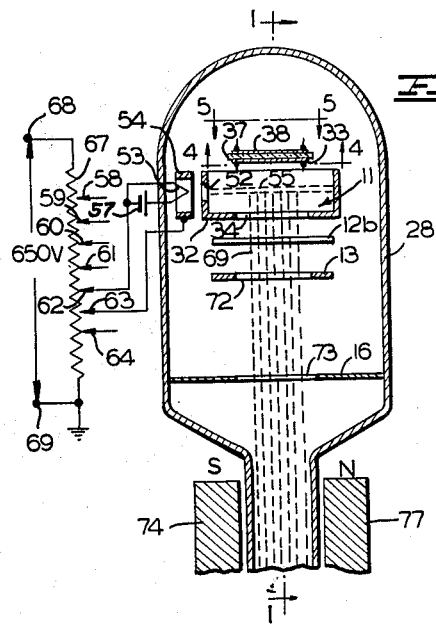
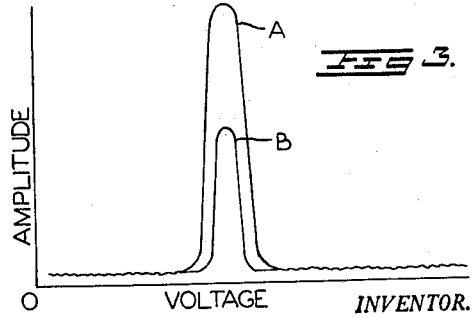
INVENTOR.
JOHN L. PETERS
BY
George L. Black
AGENT

The present invention relates to mass spectrometer leak detectors.

A mass spectrometer leak detector is an instrument for detecting minute leaks of a predetermined tracer gas through the hermetically sealed walls of a vacuum or pressure sealed enclosure. The basic parts of a leak detector are: a source of ions; an ion beam producing means; an analyzing and focusing means; an ion collector, an electrometer amplifier; and an output meter. The intensity of the ions that reach a focus at the collector is related to the leak rate of the tracer gas.

At the present time, the most widely used mass spectrometer leak detectors are of the sector field type having a single analyzing stage, and are sufficiently sensitive to detect a minimum leak rate of about $10^{-10}$ standard cubic centimeters per second. Although this leak rate is small enough for approximately 5000 years to elapse before one cubic inch of air can pass through the leak, a more sensitive detector is desired. Furthermore, of the mass spectrometer leak detectors presently used in the art, the detectors that employ a D.C. electrometer amplifier produce an output signal that drifts.

Therefore, it is an object of the present invention to provide a sector field mass spectrometer leak detector having a single analyzing stage that is more sensitive than prior art leak detectors having a single analyzing stage.

It is another object to provide an improved sector field mass spectrometer leak detector having a single analyzing stage that is more sensitive than most prior art leak detectors and is inexpensive to manufacture.

It is a further object to provide a sector field mass spectrometer leak detector having a single analyzing stage that has a sensitivity of approximately $10^{-11}$ standard cubic centimeters per second.

Still another object is to provide, in a mass spectrometer leak detector, an improved source of ions for producing a more intense and a more uniform ion beam.

Yet another object is to provide, in a mass spectrometer leak detector, means for producing a more intense focus of ions of a predetermined tracer gas.

A further object is to provide, in a mass spectrometer leak detector, an improved D.C. electrometer amplifier for minimizing drift in the signal that appears at the output meter of the leak detector.

The foregoing and other objects and advantages of the invention, which will become more apparent from the detailed description of the drawings, are achieved: by a novel construction for the repeller-heater assembly that is used in the ion source of the leak detector; by a novel choice of the ion beam accelerating voltage that is used in the leak detector; and by employing as part of the leak detector, a novel D.C. electrometer amplifier. The combination of the above improvements cooperate to achieve a leak detector sensitivity that unexpectedly is of the order of $10^{-11}$ standard cubic centimeters per second in an instrument that has a single analyzing stage.

In the repeller-heater assembly, the repeller is constructed so that its ion repelling face remains fixed relative to the elements of the ion source even though the repeller is heated to a high temperature. The heater is insulated from the repeller. An adjustable means is employed for producing a voltage gradient across the repeller. A further adjustable means is employed for energizing the heater independently of the voltage gradient across the repeller. Also means are provided for independently changing the voltage of the repeller with respect to the voltage of the ion chamber in the ion source.

The ion beam accelerating voltage is approximately double the usual voltage for sector field leak detectors which conventionally are operated at approximately 300 volts. The analyzer magnet produces a sector field that has a flux density which is substantially larger than is utilized in prior art sector field leak detectors.

In the D.C. electrometer amplifier, drift is minimized by providing means for heating the filament of the input pre-amplifier tube to its operating temperature before supplying other operating voltages to the tube.

In the drawings,

FIG. 1 is a sectional view, partially schematic, of a mass spectrometer leak detector in accordance with the present invention;

FIG. 2 is a sectional view at right angles with the view shown in FIG. 1, and is taken along the line 2—2 in the direction of the arrows;

FIG. 3 is a plot of the amplitudes of two output signals versus ion beam accelerating voltage for two different sets of conditions;

FIG. 4 is an enlarged plan view of the repeller face of one form of a repeller-heater assembly for the ion source shown in FIGS. 1 and 2, and is taken from the line 4—4 in FIG. 2 in the direction of the arrows;

FIG. 5 is a plan view of the heater face of the repeller-heater assembly whose repeller face is shown in FIG. 4, and is taken from the line 5—5 in FIG. 2 in the direction of the arrows;

FIG. 6 is a cross-sectional view of the repeller-heater assembly shown in FIGS. 4 and 5;

FIG. 7 is an enlarged plan view of the repeller face of another form of a repeller-heater assembly;

FIG. 8 is a plan view of the heater face of the repeller-heater assembly whose repeller face is shown in FIG. 7;

FIG. 9 is a cross sectional view of the repeller-heater assembly shown in FIGS. 8 and 9;

FIG. 10 is an enlarged plan view of the repeller face of still another form of a repeller-heater assembly;

FIG. 11 is a plan view of the heater face of the repeller-heater assembly whose repeller face is shown in FIG. 10; and FIG. 12 is a cross sectional view of the repeller-heater assembly shown in FIGS. 10 and 11.

Referring to FIGS. 1 and 2, the parts of mass spectrometer leak detector are schematically shown as; a source of ions having an ion chamber 11; an ion beam producing, analyzing and focusing means consisting of focusing electrodes 12a and 12b, accelerating electrode 13, an ion baffle 16, a magnet 17, ion baffle 18, and ion decelerating and focusing electrode 21; an ion collector 22; an electrometer amplifier consisting of a D.C. pre-amplifier input tube 23, and additional D.C. amplification stages 26; and an output current meter 27. A vacuum envelope 28 houses most of the parts of the leak detector and supports these parts by means, not shown.

The envelope 28 is illustrated as being made of non-conducting material, but instead it could be made of metal. The envelope 28 is evacuated to a pressure of $10^{-5}$ to $10^{-6}$ mm. Hg, for example, by a vacuum pump 29 that is connected to the envelope in the vicinity of the ion baffle 16, for example.

In the vicinity of the ion chamber 11, the envelope 28 is connected to a tracer gas inlet 31. The inlet 31 permits a tracer gas that has leaked through the walls of a vacuum or pressure sealed enclosure, not shown, to pass into the vacuum envelope 28. The vacuum pump 29 draws this gas through the ion chamber 11 during operation of the leak detector. The vacuum or pressure sealed enclosure is tested for leaks by using helium tracer gas, for example, in any one of several different ways known in the art.

The ion chamber is formed by a rectangularly shaped box-like electrode 32 and an ion repeller 33. The box-like electrode 32 is open at its top. Electrode 32 is closed at its bottom except for a rectangularly shaped slit 34 that lies in the plane of FIG. 2. The repeller 33 is supported just above the top of electrode 32. A narrow insulating space is left between the repeller 33 and the electrode 32.

In accordance with one of the important aspects of the invention, the ion repeller 33 is rigidly supported upon one side of an insulator 37. This ensures that the face of repeller 33 will remain fixed with respect to the electrode 32 when the repeller is heated.

A heater 38 is supported by the other side of the insulator 37 to form a repeller-heater assembly. The heater 38 is energized to a temperature of approximately 700 degrees centigrade, for example. Heating is used to minimize contamination of the ion chamber 11. Several different forms of the repeller-heater assembly are shown in FIGS. 4–12. They will be described in more detail further below.

An adjustable source of voltage is connected to opposite sides of the repeller 33 for producing a voltage gradient across the face of the repeller in the plane of FIG. 2. This adjustable source comprises a D.C. voltage supply 42, a resistor 43 across the supply 42, and an adjustable tap 44 upon resistor 43. An adjustable source of voltage also is connected to opposite sides of the heater 38 for energizing the heater 38 to heat it to a desired temperature. This heater source comprises a D.C. voltage supply 47 (although instead it could be an A.C. supply), a resistor 48 across the supply 47, and an adjustable tap 49 upon resistor 48. Therefore, means in accordance with another important aspect of the invention are provided for changing the voltage gradient across the face of the repeller 33 and for independently varying the voltage that energizes the heater 38.

As is shown in FIG. 2, one of the narrow side walls of the box-like electrode 32 is provided with a small rectangular slit 52. Supported opposite the slit 52 and within the vacuum envelope 28 by suitable means, not shown, a filament 53 and a focusing electrode 54 produce an electron stream 55 that passes into the ion chamber 11. The focusing electrode 54 is shaped to form an electron stream 55 that has a rectangular cross section for passage through the rectangular slit 52. A suitable design for the focus electrode 54, for example, is similar to that shown and described in an article entitled "Mass Spectrometer Leak Detector With Improved Sensitivity," by John L. Peters, on page 1094 of The Review of Scientific Instruments, vol. 30, No. 12, December 1959.

The filament 53 is energized by a voltage supply 57 shown in FIG. 2. A D.C. voltage supply is shown, but instead an A.C. voltage supply could be used.

As is shown in both FIG. 1 and FIG. 2, the various electrodes of the source of ions are connected to certain ones, respectively, of a plurality of adjustable taps 58–64 that are provided along a resistor 67. The resistor 67 is connected across the output terminals 68 and 69 of a regulated D.C. voltage supply, not shown. The terminal 69 is grounded, for example, terminal 68 being at a positive voltage with respect to ground by approximately 650 volts, for example.

In accordance with another important aspect of the invention, the box-like electrode 32 is connected to tap 59 for operation at approximately 600 volts, which is approximately double the usual voltage for sector field leak detectors. Both the repeller 33 and the heater 38 are connected to the tap 58 for operation at approximately ten volts positive with respect to the voltage of the box-like electrode 32. The filament 53 is connected to the tap 62 for operation at approximately 150 volts negative with respect to the voltage of the electrode 32.

The focusing electrode 54 is connected to tap 63 for operation at approximately twenty volts negative with respect to the voltage of the filament 53.

As the electron stream 55 crosses the ionization chamber 11, it collides with molecules of gas that have been drawn into the chamber from the tracer gas inlet 31. Positive ions are produced. These ions are repelled toward the bottom of chamber 11 by the repeller 33. By adjusting the voltage gradient across the ion repelling face of the repeller 33 to achieve a small voltage drop, of the order of one to twenty volts, space charge of the electron stream 55 is neutralized. This space charge neutralization increases the electron current of the electron stream 55. Consequently, more positive ions are produced and as a result, the sensitivity of the mass spectrometer is increased. It has been found that the sensitivity also is increased and remains constant because of the fact that the face of repeller 33 stays fixed with respect to the box-like electrode even though the repeller 33 is heated to a high temperature by the heater 38. In prior art leak detectors, it has been found that the repeller adversely affects the leak detector sensitivity because the ion repelling face of the repeller warps and twists as it is heated.

The voltage gradient across the repeller 33 is critical. If it is too large or too small, space charge neutralization will not be effective. Furthermore, if the repeller voltage is too high (more than a few volts), the repeller 33 will attract electrons from the electron stream 55. If electrons are attracted by the repeller 33, the number of ions that are produced is reduced. Thus, it is important that the voltage gradient across the repeller 33 be optimized by suitable adjustment of the tap 44.

It also is important that the voltage of the repeller with respect to the box-like electrode 32 can be adjusted independently from the other voltages. This is achieved by adjusting the tap 58. Also of importance is the fact that the voltage supplied to the heater 38 is adjustable independently by adjusting the tap 49. For each mass spectrometer leak detector that is manufactured, the optimum voltage gradient across the face of the repeller 33, the optimum voltage of the repeller 33 with respect to electrode 32, and the optimum voltage supplied to the heater 38 are arrived at by trial and error for achieving the best and most nearly constant leak detector sensitivity.

The positive ions produced in the ionization chamber 11 are formed into an accelerated ion beam 69 having a rectangular cross section. This beam passes through the rectangular slit 34 at the bottom of the ion chamber, through the focusing electrodes 12a and 12b, and through the accelerating electrode 13. The ion beam is wedge-shaped, and comes to a line focus in the vicinity of the accelerating electrode 13.

The focusing electrodes 12a and 12b are separate plates. The adjacent edges of plates 12a and 12b are linear and parallel with the plane of FIG. 2. These edges are symmetrically located on opposite sides of the wedge-shaped ion beam 69, as is shown in the drawings. The plates 12a and 12b are connected to the adjustable taps 60 and 61 for operation at slightly different voltages. Each of these voltages is approximately sixty volts negative with respect to the voltage of the box-like electrode 32.

The accelerating electrode 13 contains a rectangularly shaped slot 72 for passage of the ion beam therethrough. This electrode is connected to ground. Therefore, an ion beam accelerating field of approximately 600 volts is produced.

As the ion beam passes through the accelerating electrode 13, it diverges and passes through a rectangular opening 73 in the baffle 16 supported between the electrode 13 and the analyzer magnet 17. The baffle 16 is connected to ground. It is provided for intercepting stray ions to keep them from reaching the ion analyzing and focusing means.

In the ion analyzing and focusing means, the magnet 17 has two poles 74 and 77 that are located on opposite sides of the vacuum envelope 28. The magnetic polarities of these poles are shown in FIG. 2. The sector magnetic field produced between poles 74 and 77 is orthogonal to the ion beam. This field causes the beam to bend along a curve in accordance with the equation:

$$\frac{m}{e} = \frac{Kr^2H^2}{V}$$

wherein the ratio $$\frac{m}{e}$$

is the mass to charge ratio of the ions of a predetermined tracer gas that enter the magnetic field, K is a constant, $r$ is the mean radius of curvature of the ions of the predetermined tracer gas, H is the flux density of the magnetic field in gauss, and V is the ion accelerating potential in volts. The value of the ion accelerating potential and the value of the flux density are chosen to bring the ions of a predetermined tracer gas to a focus at the collector 22. For a helium tracer gas, the accelerating voltage V is approximately 600 volts and the magnetic flux density H is approximately 1400 gauss.

By utilizing the above values for the accelerating potential and magnetic flux density, helium ions are focused with a larger peak intensity at the collector 22, compared with prior art leak detectors that utilize much lower values of potential and flux density. The reasons for this are not clear, although it is believed that by using higher values for V and H: the energy spread among the ions becomes less important, resulting in an improvement in resolution; a larger percentage of ions passes through the slit 34 of the ion chamber 11; and lateral spreading of the ion beam decreases.

To illustrate the above, for two sets of conditions, FIG. 3 is a plot of the amplitudes of two output signals that are indicated by the output current meter 27 versus ion beam accelerating voltage, using the same leak rate of a tracer gas into the vacuum envelope 28. Curve A shows the amplitude of a helium ion tracer gas peak using an accelerating potential of 600 volts and a magnetic field of approximately 1400 gauss. Curve B shows the amplitude of a helium ion tracer gas peak using an accelerating potential of 300 volts and a magnetic field of approximately 1000 gauss. The peak of curve A is about twice as large as the peak of curve B. These curves are based upon actual measurements that have been made. For higher values of accelerating potential and flux density, the amplitude of a helium peak might be slightly higher than the peak of curve A. However, a point of diminishing returns is reached for helium tracer gas at approximately 600 volts and 1400 gauss.

After the ion beam leaves the ion analyzing field produced by the magnet 17, it passes through a rectangular opening 78 in the baffle 18. The baffle 18 is connected to ground, and intercepts stray ions as the ion beam proceeds toward the collector 22.

The ion decelerating and focusing electrode 21 is next to the collector 22. Electrode 21 has a small rectangular opening 79 for passage of the ion beam therethrough. The electrode 21 is conected to the adjustable tap 64 for operation at approximately 300 volts positive with respect to ground.

The collector 22 is a plate, for example. It is connected to ground by an input resistor means 82 of the pre-amplifier input tube 23. The resistor means 82 should have a very high value of resistance such as $10^{11}$–$10^{12}$ ohms. The resistor means 82 is: a single resistor, several resistors connected in series-parallel, or any suitable resistance network. The resistor means 82 is supported within the vacuum envelope 28 by means, not shown.

The pre-amplifier input tube 23 is a subminiature Raytheon pentode type 5886, for example. This tube is widely used in mass spectrometer leak detectors, and consists of: an oxide coated filament 83, a control grid 84, a screen grid 85, a suppressor grid 86 tied to the middle of filament 83, and an anode 87. Tube 23 is supported within the vacuum envelope 28 by means, not shown.

The control grid 84 of tube 23 is connected to the ion collector 22 of the leak detector for amplifying the ion signal. The anode 87 is connected to additional amplification stages 26 of the electrometer amplifier.

The output of the D.C. electrometer amplifier 26 is connected to the output current meter 27 by the lead 88. The meter 27 is a conventional electrometer microammeter. The meter 27 measures and indicates the amplitude of the ion signal produced at the ion collector 22 of the leak detector.

Heretofore the use of a D.C. electrometer amplifier has produced drift in the output signal indicated by meter 27. By employing an A.C. amplifier instead of a D.C. amplifier, drift can be minimized. However, there are certain advantages in using a D.C. amplifier. In accordance with another important aspect of the invention, drift in the output signal is minimized by pre-heating the filament 83 of the pre-amplifier input tube 23 before electron emission current is drawn.

The source of operating potential for tube 23 is a regulated D.C. voltage supply 90 whose positive terminal is connected to the anode of tube 23 through a switch 91 and a load resistor 92. The negative terminal of the voltage supply 90 is connected to ground. A resistor 94 is connected across the terminals of the D.C. voltage supply 90. The screen grid voltage is obtained from an adjustable tap 95 upon resistor 94. A switch 96 is provided in the screen grid voltage supply connection.

A regulated D.C. voltage supply 97 heats the filament 83. Resistors 97 and 100 connect the opposite ends of the filament 83 to respective terminals of the voltage supply 97 to operate the filament 83 at a voltage that is slightly positive with respect to the voltage of the control grid 84, thereby establishing the proper negative control grid bias for tube 23. The negative terminal of the voltage supply 97 is connected to ground.

The filament 83 is allowed to reach its operating temperature before any electron emission current is drawn by the tube 23. The switches 91 and 96, therefore, are kept open for a sufficient length of time to permit the filament 83 to heat to its operating temperature. For a Raytheon pentode type 5886 tube, for example, this takes from ten to twenty seconds. Then, switches 91 and 96 are closed to supply operating voltages to the tube 23 for drawing electron emmission current. It has been found that if the filament is heated before the other operating voltages are supplied to the tube 23, drift in the output signal upon meter 27 is greatly minimized.

The switches 91 and 96 may be operated either by hand or by a time delay relay, not shown. The relay would close switches 91 and 96 at the end of a predetermined time interval beginning at the moment the filament 83 is initially energized by the voltage supply 97.

Leak rates as low as approximately $10^{-11}$ standard cubic centimeters per second can be detected by a mass spectrometer leak detector as described above. This sensitivity is unexpected. Compared with a sensitivity of approximately $10^{-10}$ standard cubic centimeters per second, an improvement by a factor of approximately ten is achieved. This is accomplished without any large increase in manufacturing cost.

Experimentally, it has been found that if the above leak detector is operated with an accelerating voltage of approximately 300 volts, and with the magnet 17 producing a field whose flux density is approximately 1000 gauss, the leak detector sensitivity is increased by a factor of approximately two, compared with prior art leak detectors having a sensitivity of $10^{-10}$ standard cubic centimeters per second. This increase in sensitivity is attributed alone to the novel construction of the source of positive ions in the leak detector.

On the other hand, using a conventional source of positive ions similar to that shown and described in United States Patent No. 2,838,676, dated June 10, 1958, for example, and using an accelerating voltage of approximately 600 volts with the magnet 17 producing a sector field whose flux density is approximately 1400 gauss, the detector sensitivity also is increased by a factor of approximately two. This increase in sensitivity is attributed alone to the increases in the accelerating voltage and the flux density.

For reasons not yet apparent, using the improved ion source of the present invention together with an accelerating voltage of approximately 600 volts and a magnetic flux density of 1400 gauss, the leak detector sensitivity is increased by a factor of about ten. This is substantially larger than is expected, considering the individual increases in sensitivity by each of the improvements made alone as described above.

Three specific constructions for the improved ion repeller-heater assembly in accordance with the present invention are shown in FIGS. 4–6, FIGS. 7–9, and FIGS. 10–12, respectively. Either one of these constructions may be employed as the repeller-heater assembly in the instrument shown in FIGS. 1–2. The repeller faces of these assemblies are shown in FIGS. 4, 7 and 10, respectively, as they would appear if viewed from the line 4—4 in FIG. 2 in the direction of the arrows. The heater faces of these assemblies are shown in FIGS. 5, 8 and 11, respectively, as they would appear if viewed from the line 5—5 in FIG. 2, in the direction of the arrows.

Referring to FIGS. 4–12, the insulator 37 is a wafer-like piece of ceramic having a thickness of approximately .050 inch.. The wafer has a rectangularly shaped face, for example.

In the construction shown in FIGS. 4–6, a conductive film such as Nichrome is applied to portions of the opposite faces of the wafer 37. The film is deposited by vacuum evaporation process that is known in the art. The respective Nichrome films form the repeller 33 and the heater 38. The repeller film has a uniform resistance of 500 to 1000 ohms per square at an operating temperature of 700 degrees centigrade, for example. The heater film has a uniform resistance of 5 to 10 ohms per square, for example. The temperature of the repeller 33 is substantially independent of the voltage gradient across its high resistance, this temperature being controlled by the heater 38.

As is shown in FIG. 4, parallel strip electrodes 101 and 102 are provided along opposite edges of the face of the repeller 33. The repeller voltage supply terminals are attached to these electrodes as illustrated. These electrodes are of gold paint, for example, which is bonded to the ceramic wafer. A voltage gradient is produced across the conductive film of the repeller between the electrodes 101 and 102.

Similarly, as is shown in FIG. 5, parallel strip electrodes 103 and 104 are provided along opposite edges of the face of the heater 38, being bonded to the ceramic wafer 33. The heater voltage supply terminals are attached to electrodes 103 and 104 as illustrated for supplying about 1.4 to 2 amperes of heating current, for example. It is preferred that the electrodes 103 and 104 be at right angles with the electrodes 101 and 102. Heater current flows between the electrodes 103 and 104 through the conductive film of the heater 38 to heat the repeller-heater assembly to a temperature of approximately 700 degrees centigrade, for example. Despite this high temperature, the face of the repeller remains flat and does not become warped, twisted or out of place.

A different repeller-heater construction is shown in FIGS. 7–9. Here the ceramic wafer is a rectangular frame 37'. On the repeller side of the frame, a set of pins 106 is provided along a first of the four parts of the frame. Along the third part of the frame, which is opposite the first, another set of pins 107 is provided.

In the construction shown in FIGS. 7–9, the repeller is formed by a wire 108 that is stretched tightly across one face of the frame around the pins 106 and 107 as illustrated. This will assure that the wire remains in the same plane even when indirectly heated by the heater to 700 degrees centigrade. The ends of the wire are held securely in place in any suitable manner, and are connected to the repeller voltage supply terminals. The heater of the construction shown in FIGS. 7–9 is formed in the same way. Across the other face of the frame, a wire 109 is wound around the pins 110 and 111 provided along second and fourth parts of the frame, respectively. The heater wire 109 preferably is transverse the repeller wire 108 as illustrated. The diameter of the heater wire 108 is from .006 to .010 of an inch, for example. The diameter of the repeller wire is much less, approximately .001 inch. The repeller resistance is high enough so that a few volts across it establish the proper voltage gradient. This voltage gradient does not appreciably change the temperature of the repeller. The wires may be of 80–20 nickel-chromium alloy such as Hoskins Mfg. Co. "Chromel A."

In the construction shown in FIGS. 10–12, the heater of the assembly shown in FIG. 11, is like the heater shown in FIG. 5. Primed reference numerals are used for similar elements. The repeller, shown in FIG. 10, comprises a strip of gold paint 112 that has a configuration as shown in FIG. 10. The strip 112 is bonded to the ceramic wafer 38 to form a repeller electrode that remains in the same plane even though it is heated to a temperature of 700 degrees centigrade by the heater 38'.

Since changes could be made both in the illustrated embodiments of the invention and in the above description, and different words of description could be used without departing from the scope and spirit of the invention, it is to be understood that the invention is limited solely by the appended claims.

What is claimed is:

1. A mass spectrometer leak detector having a single analyzing stage for detecting ions of a predetermined gas comprising a source of ions, said source having a heater and a repeller that has an ion repelling face which remains fixed with respect to the other elements of said source during operation of said heater; a support for holding said ion repelling face rigidly in a single plane only on one side of said support, means for positioning said heater on the other side of said support for indirectly heating said repeller and said source of ions, an ion beam producing, analyzing and focusing arrangement for bringing ions of said predetermined gas to a focus, said arrangement including an accelerating electrode for producing an ion accelerating field that has a voltage which is substantially larger than 300 volts, said arrangement further including a magnet for producing an ion analyzing and focusing field that has a flux density which is substantially larger than 1000 gauss; an ion collector at said focus; and a substantially drift-free electrometer amplifier connected to said collector.

2. The leak detector set forth in claim 1, wherein said predetermined gas is helium.

3. The leak detector set forth in claim 2, wherein said voltage is approximately 600 volts, and said flux density is approximately 1400 gauss.

4. The leak detector set forth in claim 1, further including an insulator for supporting and insulating said heater from said repeller.

5. The leak detector set forth in claim 4, further including means for producing a voltage gradient across said repeller, and means for energizing said heater, the last two named means being independent from each other.

6. A mass spectrometer leak detector having a single analyzing stage for detecting ions of a predetermined gas comprising a source of ions, said source having a heater and a repeller that has an ion repelling face which remains fixed with respect to the other elements of said source during operation of said heater; a support for holding said ion repelling face rigidly in a single plane only on one side of said support, means for positioning said heater on the other side of said support for indirectly heating said repeller and said source of ions, an ion beam producing, analyzing and focusing arrangement for bringing ions of said predetermined gas to a focus, said arrangement including an accelerating electrode for producing an ion accelerating field that has a voltage which is substantially larger than 300 volts, said arrangement further including a magnet for producing an ion focusing field that has a flux density which is substantially larger than 1000 gauss; an ion collector at said focus; and a D.C. electrometer amplifier having an input vacuum tube that includes a filament, an electron control grid and an anode, means for connecting said control grid to said ion collector, and means for heating said filament before supplying other operating voltages to said vacuum tube.

7. The leak detector set forth in claim 6, further including an insulator for supporting and insulating said heater from said repeller.

8. The leak detector set forth in claim 7, further including means for producing a voltage gradient across said repeller, and means for energizing said heater, the last two named means being independent from each other.

9. A mass spectrometer leak detector having a single analzing stage for detecting ions of a predetermined gas comprising a source of ions, said source having a heater and a repeller that has an ion repelling face which remains fixed during operation of said heater; a support for holding said ion repelling face rigidly in a single plane only on one side of said support, means for positioning said heater on the other side of said support for indirectly heating said repeller and said source of ions, an ion beam producing, analyzing and focusing arrangement for bringing ions of said predetermined gas to a focus, said arrangement including an accelerating electrode for producing an ion accelerating field and further including a magnet for producing an ion analyzing and focusing field; an ion collector at said focus, and a substantially drift-free electrometer amplifier connected to said collector.

10. The leak detector set forth in claim 9, further including an insulator for supporting and insulating said heater from said repeller.

11. The leak detector set forth in claim 10, further including means for producing a voltage gradient across said repeller, and means for energizing said heater, the last two named means being independent from each other.

12. A mass spectrometer leak detector having a single analyzing stage for detecting ions of a predetermined gas comprising a source of ions, said source having a heater and a repeller that has an ion repelling face which remains fixed with respect to said source during operation of said heater; a support for holding said ion repelling face rigidly in a single plane only on one side of said support, means for positioning said heater on the other side of said support for indirectly heating said repeller and said source of ions, an ion beam producing, analyzing and focusing arrangement for bringing ions of said predetermined gas to a focus, said arrangement including an accelerating electrode for producing an ion accelerating field and further including a magnet for producing an ion analyzing and focusing field; an ion collector at said focus; and a D.C. electrometer amplifier having an input vacuum tube that includes a filament, an electron control grid and an anode, means for connecting said control grid to said ion collector, and means for energizing said filament before supplying other operating voltages to said tube.

13. The leak detector set forth in claim 12, further including an insulator for supporting and insulating said heater from said repeller.

14. The leak detector set forth in claim 13, further including means for producing a voltage gradient across said repeller, and means for energizing said heater, the last two named means being independent from each other.

References Cited in the file of this patent

UNITED STATES PATENTS

| 2,551,544 | Nier et al. | May 1, 1951 |
| 2,838,676 | Raible et al. | June 10, 1958 |

OTHER REFERENCES

United States Atomic Energy Commission Publication Instructions, Gei, 18293A, Leak Detector Cat. No. 6933950G3, by Apparatus Dept., General Electric, Schenectady, N.Y., 61 pages; date declassified December 10, 1946.

Mass Spectrometer Leak Detector With Improved Sensitivity, by John L. Peters, pages 1094–1096, The Review of Scientific Instruments, vol. 30, No. 12, December 1959.